MAGNETIC RECORDING AND REPRODUCING HEAD WITH GAP SPACERS OF LOW AND INTERMEDIATE PERMEABILITY MATERIAL

Filed Feb. 12, 1968 2 Sheets-Sheet 1

INVENTOR.
TENNY LODE
BY
Dugger Braddock Johnson & Westman
ATTORNEYS

INVENTOR.
TENNY LODE

United States Patent Office 3,519,763
Patented July 7, 1970

3,519,763

MAGNETIC RECORDING AND REPRODUCING HEAD WITH GAP SPACERS OF LOW AND INTERMEDIATE PERMEABILITY MATERIAL

Tenny Lode, Madison, Wis., assignor to Rosemount Engineering Company, Eden Prairie, Minn., a corporation of Minnesota Continuation-in-part of application Ser. No. 388,378, Aug. 10, 1964. This application Feb. 12, 1968, Ser. No. 707,015
Int. Cl. G11b *5/12;* G10d *15/12*
U.S. Cl. 179—100.2 9 Claims

ABSTRACT OF THE DISCLOSURE

A magnetic recording and reproducing head wherein the normal air gap is filled with two shims, one having extremely low permeability adjacent the trailing edge of the gap, and the second shim having an intermediate permeability adjacent the leading edge of the gap. The intermediate permeability shim has a permeability selected to provide an averaging of the magnetic potential sensed at the leading edge of the gap so that the output of the head does not decrease as sharply when the wave length of the signal equals the width of the gap.

This application is a continuation-in-part of my copending application, Ser. No. 388,378, filed Aug. 10, 1964, for Magnetic Recording and Reproducing Head, now abandoned.

This invention has relation to magnetic recording and reproducing heads having two spaced pole pieces over which an elongated magnetic body is moved first to record and then to reproduce electrical signals; and more particularly to such heads wherein the gap between pole pieces includes a portion of low permeability located adjacent a downstream pole and a portion having a magnetic permeability intermediate that of said pole pieces and said portion of low permeability adjacent an upstream pole piece. The effect of constructing heads in this manner is to improve the high frequency reproduction response characteristics thereof.

As is well known, signals may be recorded by changing the magnetic condition of a moving elongated magnetic body by varying the flux density across a gap between pole pieces of a magnetic core adjacent to the moving magnetic body. These signals may be reproduced by moving the elongated magnetic body across such a gap between pole pieces in contact with such pole pieces to cause a change in flux density in such a core and consequently a current in a pick-up coil or winding around such a core in accordance with the magnetic condition of said elongated body across the gap between said pole pieces. However, a difficulty presently encountered is that as the frequency of the change in magnetic condition along the elongated body becomes higher, the response induced in the reproducing head becomes lower. Since such a head may be considered as responding to the rate of change of the difference in magnetic potential across this gap, and since the potential difference across an interval of one wave length is zero, a symmetric gap playback head will be insensitive to frequencies whose wave lengths are near the effective gap width, and, theoretically, will have zero response at that frequency at which the wave length of the recorded signal equals an integral multiple of the gap length. Further, when the gap is reduced to thus raise the frequency at which the response is adversely affected, a large percentage of the flux from the recording medium or elongated body is shunted through the gap thus causing a reduction in the flux linking the pickup coil and consequently reducing the output voltage. The magnitude of the shunting effect is a function of the recorded signal wave length and causes poorer relative high frequency response as well as low output at all frequencies.

The upper limit of the frequency response of a recording head for recording purposes is largely determined by the abruptness of the departure of the magnetic strip from the influence of the pole piece at the downstream or trailing edge of the gap. To effectively record a signal of a given frequency, an area of the strip which has been magnetized in one direction by the alternating current signal must move out of the region of high magnetic field intensity before being de-magnetized by the next opposite half cycle. Hence, the upper frequency limit (or lower wave length limit) when recording with a head of this type is determined largely by the sharpness of the downstream or trailing edge gap.

For moderate frequencies, the playback voltage or current will increase with frequency by a factor of two (six decibels) per octave because the voltage induced in the windings is proportional to the rate of change of magnetic flux rather than the magnitude of the magnetic flux through the head. As explained above, at higher frequencies, the response begins to fall as wave lengths and gap effects become significant.

Thus, while the upper limits of frequency response for a record head is limited by the sharpness of the gap trailing edge, the upper limit of the frequency response of a reproducing head is limited by the effective width of the gap. Therefore, many heads are capable of recording frequencies higher than they can effectively reproduce. Hence, the present improvement in the reproducing frequency response improves the frequency response of the entire recording system.

In a recording and reproducing head made according to the present invention, the upstream or leading edge of the gap is deliberately rounded or broadened while the downstream or trailing edge of the gap is maintained as sharply defined as possible.

This result is accomplished by employing two separate shims completely filling the space between the pole faces. A first shim of extremely low magnetic permeability is situated adjacent the downstream pole piece, and a second shim of material having magnetic permeability intermediate that of the magnetic core and the first shim completely fills the space between this first shim and the upstream pole piece.

In use, the lines of magnetomotive force leaving the elongated magnet body or tape on the upstream side thereof and passing into the upstream pole piece will be distributed from an upstream point immediately adjacent the pole face throughout the thickness of the second shim of intermediate permeability; while the lines of force passing between the downstream pole piece and the downstream portion of the tape will be confined to an area very close to the downstream pole face. Thus the magnetic potential sensed at the broad upstream gap edge will be averaged over one or more cycles at higher frequencies and will, therefore, be nearly constant. Accordingly, the difference between this average magnetic potential sensed at the broad upstream edge and the magnetic potential sensed at the sharp downstream edge will not pass through a null as the recording wave length approaches the apparent gap width. In fact, frequencies up to and beyond the frequency whose wave length corresponds to the effective gap width can be effectively reproduced using the structure of the invention.

Figure 4:
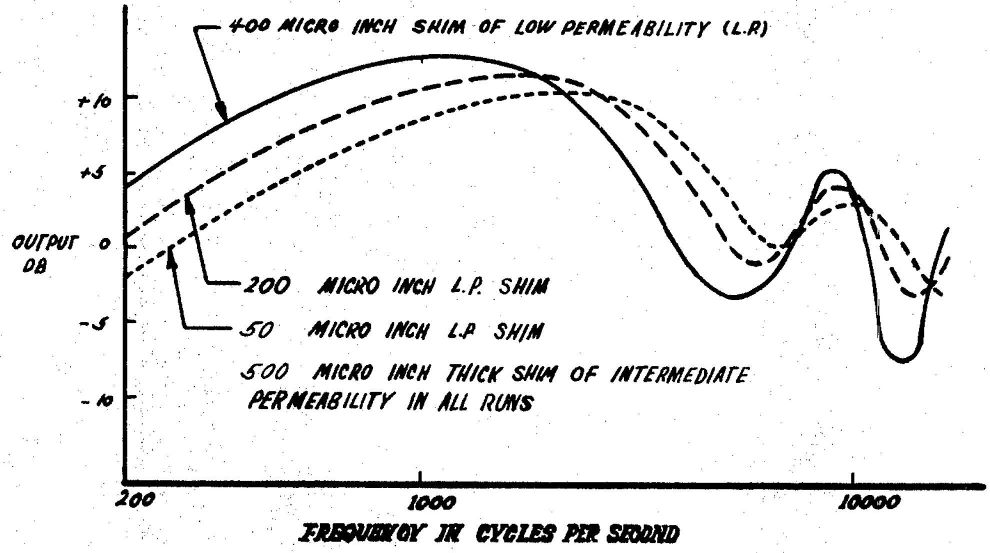
Figure 9:
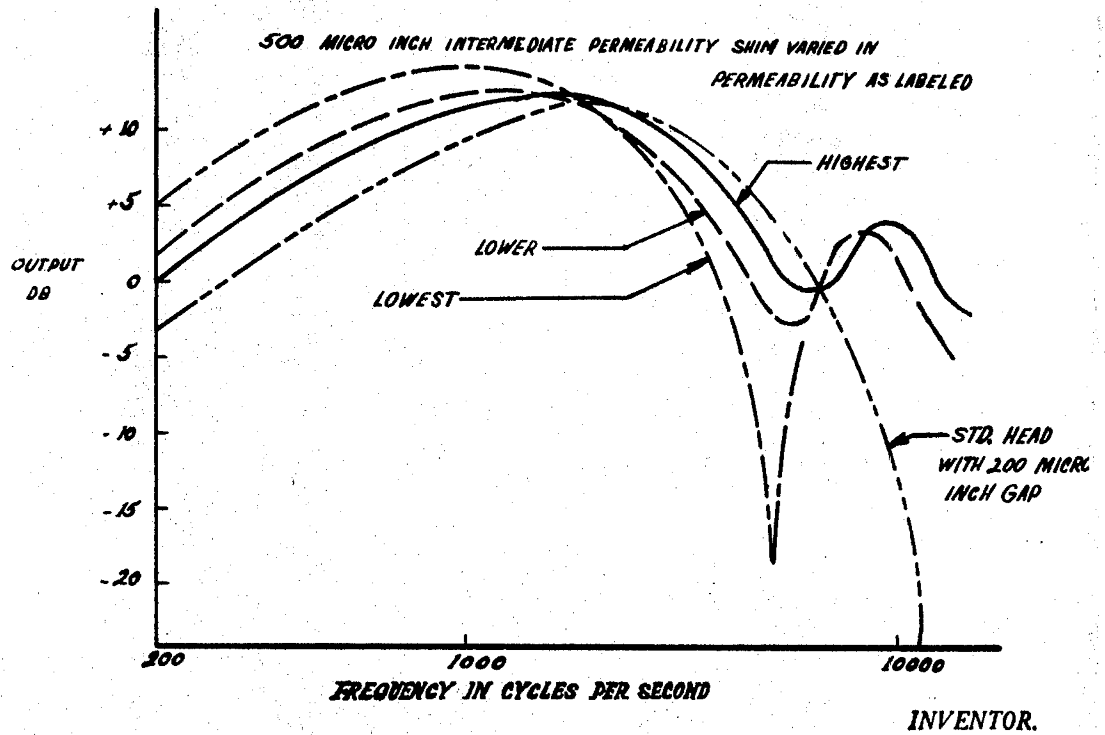

FIG. 4 is a graphical representation of head output versus frequency when the thickness of the non-permeable shim of the device of the present invention is varied; and FIG. 5 is a family of curves plotted as head output versus frequency showing the effect of reduction in premeability of the intermediate permeability shim of the device of the present invention with a superimposed curve of the output of a conventional head with a 200 micro-inch gap.

Referring now to the drawings and the numerals of reference thereon a magnetic core 10 of a magnetic recording and reproducing head 9 of the prior art typically consists of pole pieces 11 and 12 which are usually fabricated from thin laminations or ferrites to reduce eddy current losses. For mechanical convenience, the pole pieces are joined at a back gap 13 and are provided with parallel spaced pole faces 14 and 15 respectively which are spaced from each other by a gap 16 which is completely filled with a shim 17 of material which has extremely low effective magnetic permeability at high frequencies.

A strip 18 of wire or tape or other suitable elongated magnetic record medium is in physical contact with pole pieces 11 and 12 and is moving in the direction indicated by the arrow 19.

In recording, as the elongated strip 18 passes across the gap 16, magnetic lines of flux existing in the core 10 will pass between the pole pieces 11 and 12 through the elongated strip 18, thus changing the magnetic condition of the strip in accordance with the change of flux lines in the core.

When being used to reproduce signals recorded on the strip 18, a voltage will be induced in the core winding or pickup coil which is proportional to the rate of change of the difference in magnetic potential across the gap 16 between the pole pieces. As previously pointed out, the potential difference of an interval of one wave length is zero, so as the recorded wave lengths approach the width of the gap 16, the playback head will become increasingly insensitive.

Figure 1:
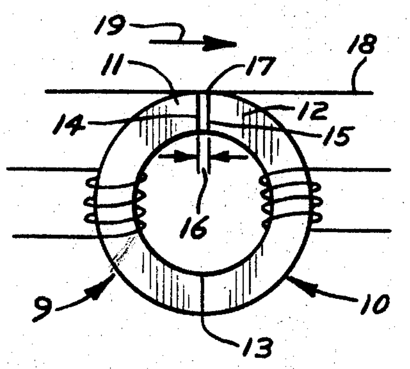
FIG. 1 is an elevational view of a magnetic recording and reproducing head of the prior art, showing the relationship of an elongated moving strip of magnetic material thereto.
Figure 2:
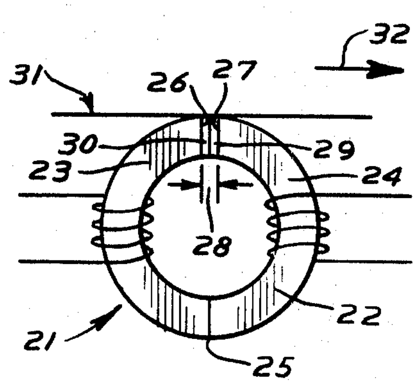
FIG. 2 is an elevational view of a magnetic recording and reproducing head made according to the present invention and showing the relationship of an elongated moving strip of magnetic material thereto.
Figure 3:
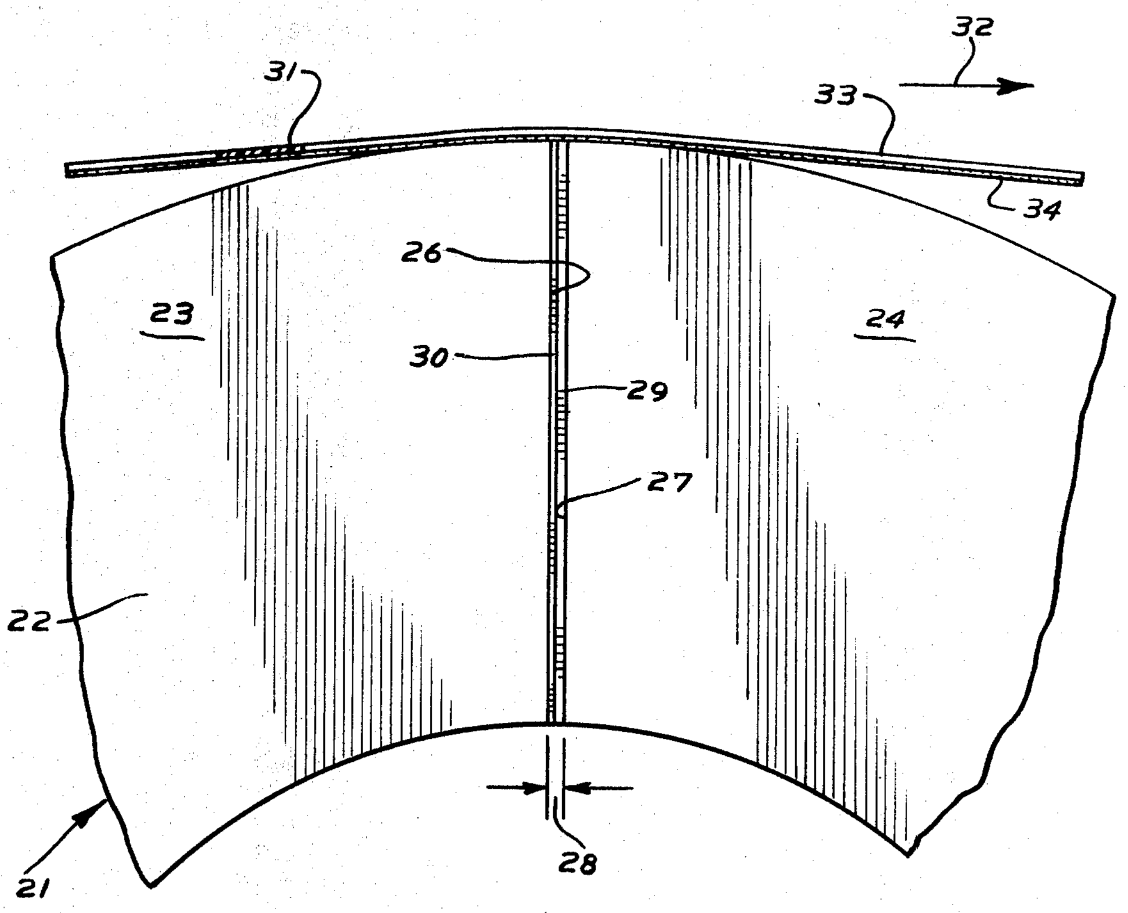
FIG. 3 is an enlarged fragmentary elevational view of a portion of the head and strip of FIG. 2.

In a device made according to the present invention and as illustrated in FIGS. 2 and 3, a magnetic recording and reproducing head 21 includes a magnetic core 22 having first and second pole pieces 23 and 24 respectively joined together at a back gap 25 and having first and second parallel, spaced apart pole faces 26 and 27, respectively, separated from each other by a gap 28 which is completely filled by a first shim 29 and a second shim 30. First shim 29 is of material having an extremely low effective magnetic permeability at high frequencies (non-permeable) and is situated in contiguous adjacent relationship to the pole face 27. Second shim 30 is of material having an effective magnetic permeability intermediate that of the magnetic core 22 and the first shim 29 and is situated in contiguous relationship both to pole face 26 and first shim 29.

A strip 31 of elongated magnetic record medium moves across the gap 28 in physical contact with the pole piece 23, the second shim 30, and the pole piece 24, and moves in the direction of the arrow 32. It includes a flexible backing sheet 33 of insulating, non-magnetic material and a layer of magnetizable material. In normal circumstances the strip will be in contact with the first shim 29 also, but this is not important to the electromagnetic operation of the invention.

The shim 29 could be either paramagnetic or diamagnetic as both are considered low permeability materials.

The intermediate permeability material has a permeability that is significantly different from the low permeability material in order to give the desired averaging effect. For example, the permeability of air is 1. Paramagnetic materials and diamagnetic materials have a permeability little different from unity as well. Shims of these materials are low permeability and act almost like air gaps.

The relative permeability of the cores used is normally in the range of 1000 or more. The intermediate permeability shim preferably has a relative permeability several times the low permeability shim and ranges up to about ½ of the core permeability. It thus is substantially higher in permeability than the low permeability shim, as well as being substantially lower in permeability than the core.

OPERATION

When the head 21 is used to record a signal because of the sharply defined trailing edge, it operates in virtually the same manner as does the magnetic recording and reproducing head 9 which is typical of the prior art.

When head 21 acts as a reproducing head, however, the magnetically effective edge of the upstream pole piece 23 is broadened. For low frequencies, head 21 operates in the same manner as head 9 of the prior art. For higher frequencies, since the magnetic lines of flux pass through shim 30 as well as immediately adjacent to the pole face 26, the magnetic potential sensed by the upstream pole 23 is averaged over one or more cycles and thus is nearly constant. The variation in magnetc potential sensed by the pole piece 24 on the other hand, is relatively sharp since there is no path for the magnetic lines between the downstream end of the magnetic strip 31 and the pole piece 24 except immediately adjacent the pole face 27. The signal generated in the pickup coil responds to the rate of change of the difference in magnetic potential across the gap. This rate of change will not approach zero even at higher frequencies because the difference is between an average value of magnetic potential on the one hand and a specific value on the other hand. Thus, the output of the head will not approach zero even when the wave length corresponds to the effective gap width.

Experimental heads using the concept of the present invention were constructed. The results obtained are shown in FIGS. 4 and 5. The runs for the tests shown were with a tape speed of 3.75 in./sec. FIG. 4 shows a family of curves plotting head output versus frequency obtained when the low permeability material shim 29 (silicon monoxide) was varied between 50 and 400 micro-inches in thickness. The curves are labeled to show the different thickness of the low permeability shims. The voltage output from the head was measured as the input signal frequency was changed. The intermediate permeability material was a precisely hammered steel foil having a permeability estimated at approximately $\frac{1}{10}$ of the core material (which was moly permalloy) and was approximately 500 micro-inches in thickness. The thickness of the intermediate permeability shim remained constant for the series of tests. The variation in thickness of the low permeability shim did not significantly change the level of the minimum points in the head response curve. The head output remained at a measurable level across the entire frequency range. The signal did not reach a null point when the wave length corresponded to the effective gap width (see conventional head curve in FIG. 5).

In FIG. 5 there is a family of curves labeled highest, lower and lowest obtained with a head using a 200 micro-inch thick non-permeable (or low-permeable) shim in all three runs (silicon monoxide again) while the permeability of the shim corresponding to spacer 30 (intermediate material) was varied between a maximum and minimum. The intermediate permeability shim was 500 micro-inches thick. The maximum permeability of the intermediate permeability shim used was approximately $\frac{1}{10}$ of the core permeability using the steel foil shim (curve labeled "highest"). For subsequent tests this steel foil shim material was heat treated differently to reduce its permeability in two stages. The curve resulting with the intermediate permeability shim 30 at its lowest tested permeability (labeled "lowest") shows that the response did drop off substantially but still gave better response than a standard head. It should be noted that the lowest permeability of the intermediate shim used in the head from which these curves were plotted was higher in permeability than the low permeability shim. By extrapolation it follows that when two shims of low permeability are used, the head would respond much like a head with a straight air gap. With the two shims, one low permeability and one intermediate permeability in the gap, there is no sharp null reached at higher frequencies, as with a standard head. The output of the head remains high across the range of operation when the two shims, one of low permeability adjacent the trailing edge of the gap and one of selected intermediate permeability at the leading edge portion of the gap, are used for example, the shims used in the heads to obtain the first two curves of FIG. 5 give excellent results, and even the "lowest" curve shows better response than the standard head.

"Intermediate" permeability is recognized as meaning a permeability level that is substantially different in permeability from the low permeability shim and also substantially different from the core material. The permeability of the intermediate shim is selected to average the signal from the record medium across at least one cycle at the frequency where the wave length equals the gap width. This permeability level is easily selected in relation to the core material and the low permeability shim.

In place of shims, per se, material could be deposited in place on the core pole faces to form the zones having different permeabilities of material. Further, a head could conceivably be treated to change its magnetic properties in a gap zone to accomplish the same results.

In FIG. 5, it should be noted that the total gap length for the gaps having the dual permeability shims is 700 micro-inches. Superimposed on FIG. 5 is a curve for a standard recording head having a 200 micro-inch gap filled with silicon monoxide and with no dual permeability. The standard head reaches a very low output at a higher frequency with the narrower gap. The curves are plotted with a logarithmic scale for the frequency.

The problems which the present invention overcomes have long been recognized. One attempt at an improved reproducing head at high frequencies is described in U.S. Pat. No. 2,469,266 to W. A. Howell. This patent discloses an irregular or wedge-shaped gap which claims accomplish much the same purpose as a device of the present invention. That is, Howell says he achieves the effect of a broad upstream gap edge and a sharp downstream gap edge with its consequent good recording and good high frequency reproducing response characteristic; but does so by employing a pole face which is perpendicular to the direction of travel of the magnetic recording medium on the downstream side and a pole face on the upstream side which is in non-parallel relationship to the downstream pole face. A theoretical consideration of the disclosure of the Howell patent would seem to lead to a conclusion that the high frequency response characteristic of his reproducing head should approach the characteristics of the reproducing head of the present invention. However, certain practical considerations render it impossible to utilize the Howell structure on a commercially practical basis. In the first place, in order to consistently produce recording heads of good quality, the gap distance must be maintained within extremely close tolerances. In order to do this, it has been found that the use of accurately sized shims within the gap is very important. Production of accurate shims having parallel faces as used in the present invention is relatively simple and inexpensive, while production of shims to fit the wedge-shaped gaps of the Howell disclosure is virtually impossible. In fact, Howell discloses air as the gap material. This presupposes accurately forming an unsupported non-parallel gap which, also, is presently an impossibility on a commercial basis.

To utilize the teachings of the Howell patent, it is necessary to use an elongated record medium "having a relatively wide dimension" to produce a relatively broad upstream gap edge. On the contrary, the devices of the present invention can utilize magnetic wires, and tapes, as well as extremely narrow paths on magnetic belts and discs, the broad upstream gap edge being produced by a path for some of the magnetic flux lines through the shim of the intermediate permeability.

Recording and reproducing heads of the present invention can be produced with great uniformity and great accuracy in gap tolerances; and recording media constituted as extremely narrow paths can be used with such heads. The present invention is, therefore, a very substantial step forward over the prior art as exemplified by the aforementioned patent to Howell.

Another attempt at an improved reproducing head is described in U.S. Pat. No. 2,632,816 to J. W. Gratian. The recording and reproducing head of Gratian utilizes two shims as does a device of the present invention. However, in the Gratian disclosure, both of these shims are made of materials of high reluctance or low magnetic permeability, the material differing only in physical hardness. Gratian teaches that it is necessary to keep the gap "sheared clean" and an object of his invention is to provide a head having a minimum gap at the point of contact with the recording medium but maximum reluctance between the pole faces.

The disclosure of Gratian does not contemplate nor does it show a device which has a broad upstream edge. Accordingly, the device of the Gratian patent cannot produce the results at high frequencies obtained by the device of the present invention.

A structure such as that shown in the Gratian reference will not give the results obtained here. It is different in concept. When the intermediate permeability shim of the present device was lowered substantially, the response curve dropped off to a null point, and the averaging did not occur sufficiently to give any appreciable increase in results. In the Gratian device, both of the shims are substantially non-permeable since one is paramagnetic and one is diamagnetic, and as set forth above, both of these are considered to be substantially like a conventional head insofar as response curves are concerned. The Gratian device is designed to increase the life of the head by preventing wear on the corners of the head defining the gap.

What is claimed is:

1. A head for use in magnetic recording and reproducing systems comprising a core of magnetic material having a pair of pole pieces provided with spaced, confronting pole faces normally defining a gap therebetween over which an elongated magnetizable record medium for storing a cyclically varying magnetic signal is arranged to pass in a first direction, spacer means filling said gap, a first portion of said spacer means having a low apparent magnetic permeability approximating that of air and positioned adjacent to the trailing edge of said gap with respect to the direction of movement of said record medium, and a second portion of said spacer means having magnetic permeability intermediate that of the pole pieces and said first portion and several times the permeability of the first portion of the spacer means, said second portion extending between the first portion and the pole piece on the leading edge of the gap, the intermediate magnetic permeability of said second portion being selected so that in conjunction with the leading edge pole piece a varying magnetic signal from said medium is averaged across at least one cycle at a minimum frequency wherein the signal wave length substantially equals the gap length.

2. A magnetic transducer head comprising a core of magnetic material defining a magnetic circuit which has at least one magnetic gap between magnetic pole faces, means filling the gap, a first portion of said gap filling means being adjacent one pole face and consisting of non-magnetic material having a permeability approximating that of air and the remainder of the gap filling means consisting of material having magnetic permeability intermediate that of said magnetic core and said non-magnetic gap filling means, the intermediate permeability material having a permeability several times that of the low permeability material and being selected to effectively magnetically broaden the edge of the pole piece which is adjacent said intermediate permeability material.

3. A magnetic transducer head comprising a core of high permeability material defining a magnetic circuit which has a gap between confronting pole faces, a plurality of spacers in said gap located in substantially parallel relation to the pole faces, at least one of said spacers being comprised of low magnetic permeability material, and at least one of said spacers being adjacent an upstream pole face and being comprised of material having magnetic permeability intermediate that of said core and low permeability spacer and several times the permeability of the low permeability spacer, said intermediate permeability spacer being selected for permeability characteristics effective to provide an averaging of cyclic magnetic signals sensed at the upstream pole face across at least one cycle of magnetic signals at a minimum frequency wherein the signal wave length substantially equals the gap length.

4. The magnetic recording head described in claim 3 wherein said spacer of low permeability material is located adjacent the pole face other than said upstream pole face.

5. A magnetic transducer head comprising a magnetic core of high uniform magnetic permeability material throughout its length and having a magnetic discontinuity therein which extends across a transverse dimension of the core and is defined by first and second ends having substantially identical cross-sectional size and shape, said discontinuity being filled with a low permeability material adjacent a first end of the discontinuity and material having permeability intermediate the core and the low permeability material located between said low permeability material and a second end of the discontinuity, the intermediate permeability material having an apparent magnetic permeability several times that of the low permeability material and being selected for permeability which effectively magnetically broadens the second end of the discontinuity to provide an averaging of cyclic magnetic signals sensed at the second end of the discontinuity across at least one cycle of the magnetic signal sensed.

6. A head for use in magnetic recording and reproducing systems comprising a core of magnetic material having a pair of pole pieces provided with mutually parallel, spaced, confronting pole faces defining a gap therebetween over which an elongated magnetizable record medium is arranged to pass in a first direction between said faces, a pair of spacers in said gap, a first of said spacers being situated adjacent to the trailing edge of said gap with respect to the direction of said record medium and in contact with the trailing, downstream pole face, said first spacer being of material of low apparent magnetic permeability approximating the permeability of air, and a second of said spacers being situated adjacent to a leading edge of the gap in contact with the pole face of said pole piece in upstream direction, said second spacer having a magnetic permeability intermediate between that of the pole pieces and the first spacer and several times the permeability of the low permeability spacer so as to effectively broaden the edge of the upstream pole piece.

7. The combination as specified in claim 6 wherein said spacers completely fill said gap.

8. The combination as specified in claim 7 wherein each of said spacers has a pair of parallel faces, adjacent facing faces of said spacers being in contiguous relation to each other.

9. The combination as specified in claim 6 wherein the intermediate permeability spacer has a permeability approximating $\frac{1}{10}$ of the permeability of the core of magnetic material.

References Cited

UNITED STATES PATENTS 2,632,816 3/1953 Gratian ---------- 179—100.2

FOREIGN PATENTS 2,679 6/1953 Japan.

TERRELL W. FEARS, Primary Examiner

J. R. GOUDEAU, Assistant Examiner

U.S. Cl. X.R.

340—174.1; 346—74